May 27, 1924.
A. L. MALMBERG
1,495,705
PISTON RING
Original Filed Aug. 2, 1921
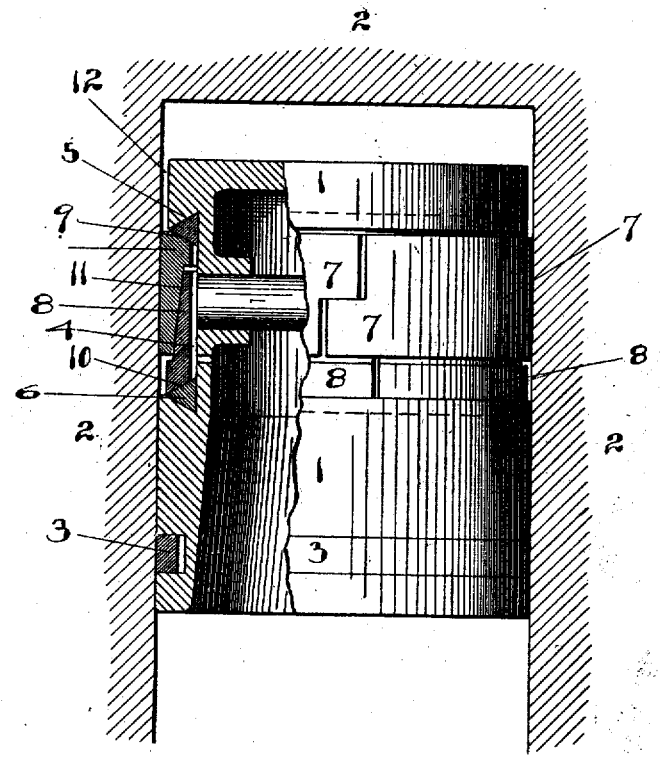
INVENTOR
AXEL L. MALMBERG.
BY C. F. Blake
ATTY.

Patented May 27, 1924.

1,495,705

UNITED STATES PATENT OFFICE.

AXEL L. MALMBERG, OF MYRTLE CREEK, OREGON.

PISTON RING.

Application filed August 2, 1921, Serial No. 489,332. Renewed December 26, 1923.

*To all whom it may concern:*

Be it known that I, AXEL L. MALMBERG, a citizen of Canada, and a resident of Myrtle Creek, Douglass County, State of Oregon, have invented certain new and useful Improvements in Piston Rings, of which the following is a specification.

My invention relates to piston rings in general, and particularly to such rings as used upon internal combustion motors, the object being to provide a leak proof ring. I accomplish the above object by means of the construction illustrated in the accompanying drawing, which is a part of this application for Letters Patent, the drawing being a piston partly in sectional elevation with my device installed thereon.

In general my device consists of a pair of transversely tapered telescopic rings with their respective tapering surfaces in contact, the exposed edge of each ring being tapered in a direction substantially normal to the contacting tapered surfaces, said rings being mounted in a dovetailed groove upon the piston; and a pair of rings triangular in transverse sectional area, each fitting within its respective dovetailed end of said groove in the piston, and each contacting with the tapered edge of the adjacent one of the first mentioned pair of rings.

In the drawing the piston 1 is illustrated disposed within the cylinder 2, and having adjacent the lower end of said piston the usual form of piston ring 3.

The upper end of the piston is grooved with a dovetail groove 4, and within each end of said groove is mounted a piston ring of triangular sectional area, as shown at 5 and 6. Also within said dovetailed groove intermediate said rings 5 and 6 are mounted a pair of telescopic rings 7 and 8. The ring 7 is provided with a beveled edge 9 adapted to contact with the ring 5, and the ring 8 is provided with a similar beveled edge 10 adapted to contact with the ring 6. The contacting surfaces of the telescopic rings 7 and 8 form a small angle with the axis of the piston 1, so that the transverse sectional areas of the rings 7 and 8 form coacting wedges, the contacting surfaces 11 of which are substantially normal to the beveled edges 9 and 10.

Above the upper ring 5 the piston is constructed to have a slight clearance 12 between it and the cylinder 2 which allows the force of the combustion to be applied upon the top of the ring 7, thus causing said ring to slide downwards very slightly upon ring 8, the relative motion of the two rings 7 and 8 occurring at the surface 11, and, due to the transverse sectional wedge shape of said rings, such relative motion forces the ring 7 outward tightly upon the inner surface of the cylinder 2 and simultaneously forces the ring 8 inward towards the piston 1 causing relative motion at the surface 10 between the ring 8 and the ring 6. This relative motion of the rings 6 and 8 forces the latter upwards, thus still further tending to tighten the ring 7 upon the cylinder wall.

It will be understood that these relative motions are infinitesimal, any appreciable motion taking place very slowly, and only as the wear of the ring 7 and the cylinder wall permits.

It is obvious that this construction provided a large wearing surface between the ring 7 and the cylinder wall, and also utilizes a small portion of the pressure within the combustion chamber of the cylinder to keep the rings tight.

My invention may be made of any size and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A piston having a dovetailed groove thereon; a pair of telescopic rings mounted within said groove upon said piston; and a pair of transversely triangular shaped rings one of which is mounted within each edge of said groove and contacting with the adjacent one of said telescopic rings.

2. In a piston ring device a pair of beveled rings; and a pair of telescopic rings having coacting beveled surfaces, and disposed intermediate said pair of beveled rings each of said beveled rings having a beveled surface coacting with a beveled surface upon the adjacent of said telescopic rings.

In witness whereof I claim the foregoing as my own I hereunto affix my signature in the presence of two witnesses at Myrtle Creek, county of Douglass, State of Oregon, this 8th day of July 1921.

AXEL L. MALMBERG.

Witnesses:
 CHAS. W. RICE,
 F. O. HAGG.